3,402,540
ADJUSTABLE HEAD CONSTRUCTION FOR
COMBINES AND THE LIKE
Elof K. Karlsson, East Moline, and Walter A. Watts,
Rock Island, Ill., assignors to International Harvester
Company, a corporation of Delaware
Filed Aug. 6, 1965, Ser. No. 477,704
7 Claims. (Cl. 56—208)

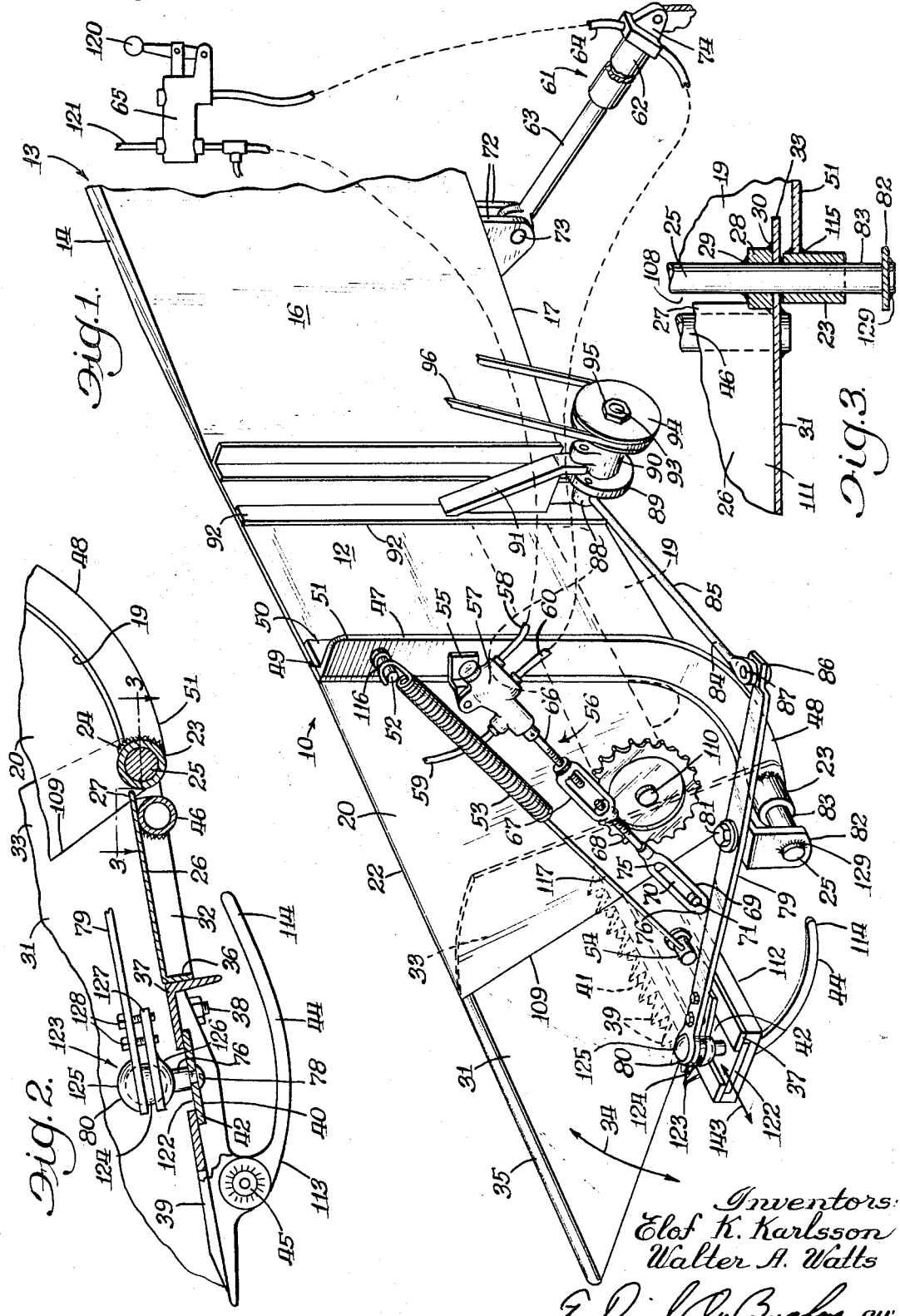

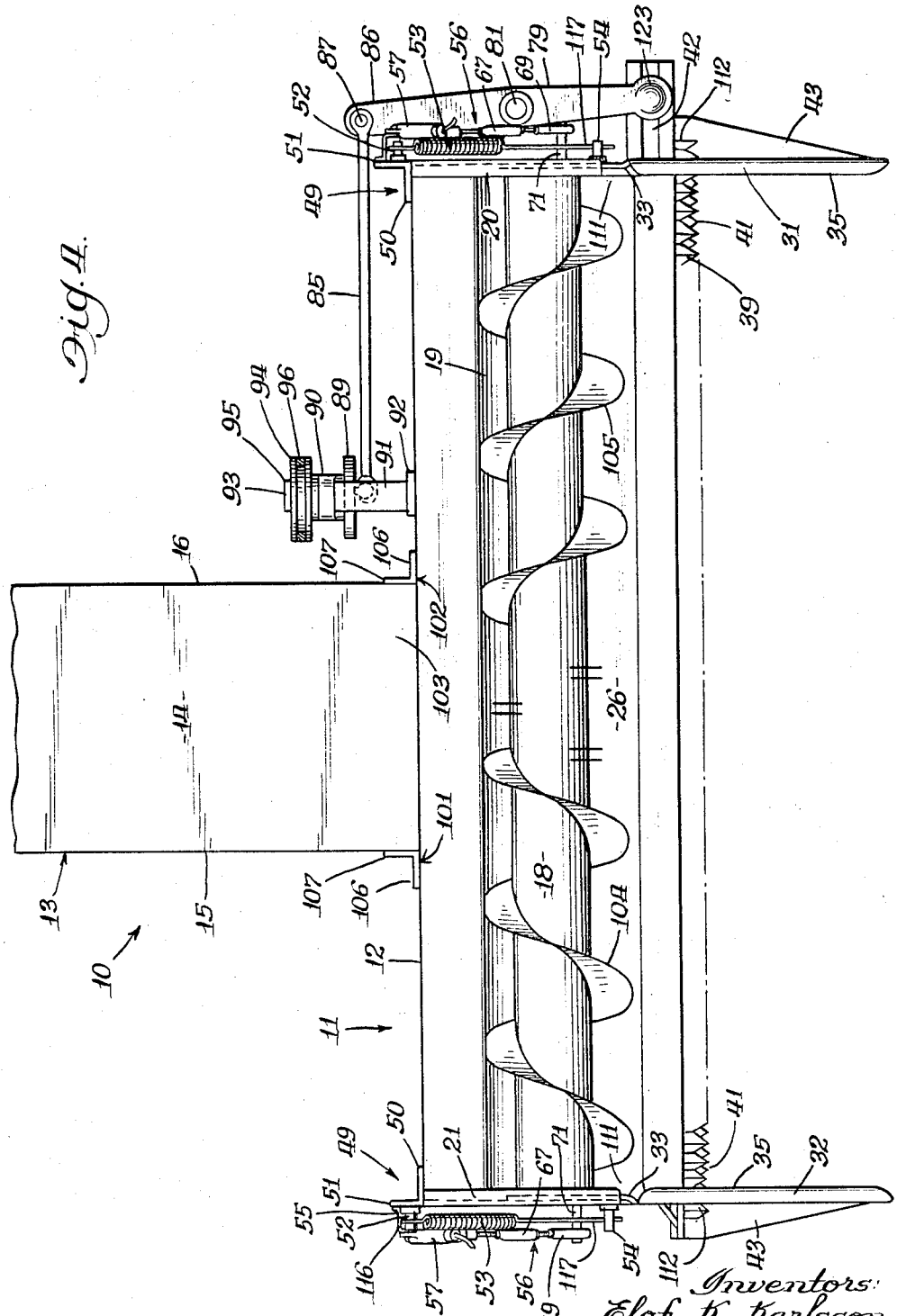

ABSTRACT OF THE DISCLOSURE

A header control for a combine having a cutter bar assembly that is pivotally mounted on the header about a horizontal axis arranged transverse to the direction of travel. A hydraulic valve is mounted on the header. The valve is linked to the cutter bar assembly and connected by a fluid conduit to the header hydraulic lift cylinders. When the cutter bar assembly is rocked to an extreme up or down position, the linkage causes the valve to direct fluid to the hydraulic ram and thus elevate the entire header.

---

The instant invention relates to header constructions for combines and the like. Particularly the invention relates to means for adjusting the height of the grain cutting mechanism of a combine and the like.

Many crops are harvested by machines such as combines which have a cutting mechanism adapted to reciprocate close to the ground to sever crop from its natural source. A reciprocative cutting mechanism conventionally is carried on the forward or lead end of a deck or crop table which defines the base or floor of a structure referred to as a platform. The cutting mechanism comprises an elongated stationary cutter which is disposed in a manner such that it is transverse of the path of a combine during harvesting. The cutter is characterized by a plurality of stationary transversely aligned cutting edges against which a sickle is transversely reciprocative to cut crop against the stationary cutting edges in a scissors-like action. Thusly cut crop is deposited on the deck or crop table of the combine employed and moved centrally and rearwardly of its platform to the front end of a feeder by a conveyor, conventional of which is a platform auger. The feeder comprises an elevator which slopes upwardly and rearwardly from the platform and is adapted for carrying therefrom crop into the body of the combine in which the crop is further processed.

For many crops, it is of economic importance that the cutting edges of a cutting mechanism be retained in proximity to the ground to maximize the amount of the grain that is recovered by cutting. Additionally, it is required that the cutting mechanism be capable of movement to avoid changes in the ground surface which might tend to damage the cutting mechanism.

To such end, heretofore, various means have been provided for controlling the elevation of the cutting mechanism, conventional of which include a sensor, such as a ground engaging shoe mounted at or adjacent the cutter. The sensor detects changes in the contour of the surface of the ground over which the cutter is moving, and responsively the cutting mechanism will rock as a result of a floating connection for the platform or the header on which the platform is mounted.

The elevation with respect to the ground of the pivot about which a floating connection is made will control the extent to which the attitude of the cutting mechanism will vary from a horizontal plane or desired posture upon being rocked. When the pivot for a floating connection is disposed at the level at which a header comprising the platform and feeder is connected to a combine body, as in many conventional devices, the likelihood of accidental ground digging by the cutting edges of a cutting mechanism and consequent injury or damage thereto is greater because the pivot for the floating connection is at its highest practical disposition.

Furthermore, the location of the pivot of a floating connection will also control the mass of structure required to be moved to rock a cutting mechanism. In conventional devices, as aforesaid, in which the entire headers rock in response to changes in ground topography, adjustment of the cutting mechanisms is slow and cumbersome because of the heavy weights which are required to be moved, such weights including not only header housing components but also feeder conveyors and platform augers, the rocking of none of which is essential to rock a cutting mechanism except for the nature or character of conventional construction. That is to say, a most efficient means for normal rocking of a cutting mechanism should require nothing or little else to rock therewith.

By providing a floating connection for a cutting mechanism and disposed adjacent thereto and having an elevation substantially the same as that of such cutting mechanism, the horizontal or desired attitude thereof will be maintained throughout the range of customary or normal topographic variation, and the adjustment periods for normal topographic variations in the ground will be minimal.

Notwithstanding, however, if variations of ground contour are extreme, the cutting mechanism will be required to traverse a floating range larger than normal. Thereby, the adjustment periods will be increased and the attitude of the cutting mechanism will be changed from the normal in the extreme parts of the increased floating range. Consequently, varying kinds of hazards would occur which could result in injury to the cutting mechanism.

For an abnormally high variation in contour, a normal rocking means may not react quickly enough to cause the cutting mechanism to avoid the obstruction. Furthermore, in the event of an abnormally low variation, the extent of the downward course of a cutting mechanism might be such that the attitude thereof will be so changed that it might dig the ground and thereby injure the cutting mechanism. Accordingly, it is desirable to provide relief means to minimize hazards of the character aforesaid.

It is an object of the instant invention to provide an improved construction in a header adapted for a combine and the like, in which means are provided for pivoting the crop cutting mechanism substantially independently of the remainder of the header.

It is another object of the instant invention to provide a crop harvesting header having a platform characterized by a cutting mechanism adjustable relative to said platform.

It is a further object of the instant invention to provide in a harvesting header and the like a floating connection means for adjusting the cutting mechanism in response to variations in ground topography and which includes a pivot disposed substantially at the same elevation as that of the cutting mechanism.

An additional object of the instant invention is the provision of a header for a combine and the like, said header characterized by a platform having a floating deck or grain table disposed a fixed distance from the ground and having a cutting mechanism secured to said floating deck.

Still a further object of the instant invention is the provision of a harvesting device such as a combine having a floating header rockable relative to the body of the harvesting device and a floating cutting mechanism rockable relative to the floating header, said header having self-actuating relief means to rock said header under extreme variations in ground topography.

Yet a further object of the instant invention is the provision of a harvesting header and the like having a cutting mechanism which floats about a substantially horizontal axis and being rockable longitudinally in a path of normal harvesting and having means for twisting opposite end portions of the cutting mechanism independently of each other and about a substantially horizontal axis disposed transversely in a path of normal harvesting.

The foregoing and other objects, features and advantages of the present invention will become more apparent upon consideration of the following description and appended claims, when considered in conjunction with the accompanying drawings wherein the same reference character or numeral refers to like or corresponding parts throughout the several views.

On the drawings:

FIG. 1 is a perspective view of a portion of a header embodying the instant invention.

FIG. 2 is a partial vertical sectional view taken on the left side of the header platform adjacent the left wall thereof.

FIG. 3 is a sectional view taken substantially on the line 3—3 of FIG. 2 and looking in the direction of the arrows.

FIG. 4 is a plan view of a part of the header.

Referring now more particularly to the drawings, there is shown a header generally designated by the numeral 10 and adapted to be connected to the lead end portion of the body of a combine and the like (not shown). The header comprises an elongated platform generally designated by the numeral 11 and having a longitudinal axis which extends in a general transverse direction relative to the normal path of the header during harvesting. The platform is characterized by a substantially vertical rear wall 12 which has a medial crop delivery aperture (not shown) from which there is projected backwardly and upwardly an elongated feeder box or housing 13 which comprises the header. The feeder box 13 has a forward end portion 103 defining a lower end opening (unseen) and comprises an upper wall or roof 14, a pair of integral opposite parallel side walls 15 and 16 and a floor 17, in which feeder box a conveyor (not shown) is disposed for translocation of cut crop. A pair of vertical right angular bars or braces 101 and 102, one leg 106 of each of which is rigidly secured to the rear wall 12, and the other leg 107 of each of which is rigidly secured to the feeder box forward end portion 103, connect the platform 11 and the feeder box 13 together, disposing the open forward end portion 103 of said feeder box 13 about the unseen aperture in the platform rear wall 12 in crop transmission association. By means of a screw 18 which may be a platform auger of conventional construction having oppositely turned threads 104 and 105, cut crop is directed medially of the platform 11 through wall 12 onto the conveyor in the feeder box 13 and carried into the combine body for processing.

The rear wall 12 of the platform extends downwardly and is bent forwardly to form a platform floor portion 19 which extends longitudinally of said rear wall and is projected forwardly therefrom only a short distance, as clearly seen in FIG. 3, said floor portion 19 being disposed partially below and providing a part of the crop table for the auger 18. The platform is defined by a pair of vertical side plates or walls 20 and 21 which are spaced apart longitudinally of the longitudinal axis of said platform 11. At their rear ends, said side walls 20 and 21 are connected to the rear wall 12 from which they are projected forwardly. At their lower ends, the side walls 20 and 21 are connected to the floor portion 19. The walls 20 and 21 are substantially of similar design, the upper edges 22 thereof being longer than the lower ends which, as illustrated in FIG. 3, terminate at or adjacent the forward edge 108 of the floor 19, thereby to provide a pair of downwardly and rearwardly sloping lead edges 109, as illustrated in FIG. 1.

The opposite end portions 110 of the shaft of auger 18 are journalled in said side walls 20 and 21.

A pair of rock or pivot pin or shaft bearings 23, only one of which is seen in the drawings, have their inner end portions rigidly secured to the side walls 20 and 21 by any suitable means such as welding, as indicated at 24 in FIG. 2. The outer end portions of said bearings 23 are projected outwardly from said side walls 20 and 21, respectively, in co-axial alignment to accommodate projection therethrough transversely of said side walls 20 and 21 of a rock or pivot pin or shaft 25.

A cutter deck 26, which with portion 19 defines the platform crop table, has its rear end portion 27 disposed immediately adjacent the lead end or edge 108 of the floor 19. The cutter deck 26 extends transversely of the walls 20 and 21 and is rockable upwardly and downwardly, that is, with respect to FIGS. 2 and 3, clockwise and counterclockwise relative to said floor 19 about the axis provided by shaft 25.

Many suitable means for pivoting the cutter deck 26 relative to the floor 19 may be employed. The mechanism for such purpose in the present embodiment comprises collar or connector means 28, as seen in FIG. 3, which may be rigidly secured on opposite end portions of the shaft or pin 25 by means of welding or the like, as at 29. The outer ends of collar or connector means 28 are rigidly secured by means such as welding, as at 30, to the lower end portions of a pair of opposed vertically disposed plates or dividers 31 and 32.

The dividers 31 and 32 are substantially parallel to each other and provide the means for mounting a reel-supporting frame and reel (not shown) used to direct grain toward a cutting mechanism to be presently described. The opposite sides 111 of the deck 26 are rigidly secured to the lower ends of the dividers 31 and 32, said dividers having a pair of rearwardly extending portions 33 which are disposed inwardly and against the inner faces of the side walls 20 and 21 against which said inner extensions 33 may telescopically slide, respectively.

Normal harvesting adjustment of the dividers 31 and 32 is in the direction of the arrow 34 seen in FIG. 1. As illustrated in FIGS. 1 and 4, inward and upward rocking, that is, pivoting of the divider clockwise with respect to FIG. 1, may be limited by engagement of a pair of lateral flanges 35 which are integral with and extend inwardly from the forward portions of the dividers 31 and 32, respectively, with the walls 20 and 21. The construction herein illustrated causes rotation or rocking of the pin or shaft 25 as the dividers 31 and 32 and the deck 26 carried thereby pivot or rock.

As illustrated in FIG. 2, the forward end of the deck 26 is defined by a downwardly extending mounting flange 36 which extends transversely of the dividers 31 and 32. There is rigidly secured to said mounting flange 36, by any suitable means, an elongated angular carrier bar 37 the longitudinal axis of which extends transversely of said dividers 31 and 32. The carrier bar which comprises the cutting mechanism has bolted thereto, by means of fasteners such as bolts and nuts generally designated 38, conventional combination fixed guard-cutters 39, the construction of which may be conventional and which are spaced from each other transversely of the dividers 31 and 32.

To facilitate a stroke of adequate width, that is, a swath of the sickle 42, to be hereinafter defined, and which will cut all grain entering the combine between the dividers, it is required that the guard-cutters 39 extend beyond the dividers 31 and 32, as shown at 112 in FIG. 4. To the end that no crop will be cut outside the dividers, the dividers are provided, respectively, with a pair of lower feet or shields 43 which hold the crop away from those portions of the cutting mechanism falling outside of the dividers 31 and 32.

The guard-cutters 39 are provided with slots which when aligned in operative position provide a track 40 extending transversely of dividers 31 and 32 for a reciprocative sickle 42 which is driven from side to side to carry sickle blades 41, only some of which have been numbered in FIGS. 1 and 4, across the fixed cutting edges of guard-cutters 39 in a scissors-like grain cutting action. The operative direction of the sickle is shown by the arrow 143 in FIG. 1. As crop is cut by the advancing cutting mechanism, it will be swept onto the deck 26 and the floor portion 19 which comprise the crop table, therefrom to be translocated as previously described herein.

To rock the cutting mechanism which comprises the cutter-guard 39 and the sickle blade 40, to maintain uniform spacing thereof from ground surface, a pair of elongated sensors such as shoes 44, only one of which is illustrated in FIGS. 1 and 2, are rigidly secured in adjusted positions on outer end portions of said cutting mechanism. The securance may be by means of suitable fasteners 45 which adjustably anchor the forward ends 113 of shoes 44 in a manner such that the rearward end portions 114 thereof will be projected rearwardly beneath the reciprocative sickle 42. Said rearward end portion 114 serves as a spacer for the cutting mechanism relative to the ground and is spaced only a short distance below said sickle 42 to procure high yields. While in the instant embodiment the shoe 44 extends rearwardly beneath the deck 26, shoe designs and dispositions other than that illustrated will be found satisfactory considering that shoe 44 serves as a detector which is adapted to ride over the ground and sense the topography thereof adjacent the sickle 42. The purpose of the foregoing is to effect rocking of the deck and rigidly connected thereto cutting mechanism about the pivot 25 in response to changes in such topography.

While the foregoing construction efficiently serves to rock the cutting mechanism, it is desirable to provide means by which the entire deck, and accordingly the entire cutting mechanism, will respond progressively across its width when topographic changes occur, for example, only at one side portion of the platform. That is to say, should there be variation in ground elevation at one side of the platform, it is undesirable to obtain an equal or zero response thereto at the other side of the platform. Rather, it is desirable that the other side reacts in the same direction by a lesser amount. With provision for such control, more efficient grain cutting is achieved than is conventionally available. To that end, an elongated torsion member 46, which in this embodiment is shown as a tube, is employed. The torsion tube is disposed with its longitudinal axis extending transversely of the dividers 31 and 32, said torsion tube being secured at each of its free ends to the under surface of the deck 26 at the rear end portion 27 thereof adjacent and slightly forward of the pivot 25. The desired amount of twist can, of course, be controlled by the selection of a torsion member of appropriate diameter. By reason of the torsion member 46, deck 26 is able to twist slightly, whereby variations in ground topography occurring at opposite sides of the deck 26 will cause the deck to twist to accommodate such variations while simultaneously pivoting or rocking in a manner such that the deck and cutting mechanism will be disposed at various elevations, thereby to assume a most efficient spaced relationship with the ground adjacent crop being cut.

The opposite side portions of the platform are rigidified by a pair of angular frame members generally designated 49, as illustrated in FIG. 4. Each of the frame members 49 has an upper vertical portion 47 and an integral lower curved portion 48 which extend beneath the floor 19, as illustrated in FIGS. 1 and 2. By means of an inwardly extending flat flange 50, each of the frame members 49 is rigidly secured to the back wall or plate 12 along a corner formed at the juncture of said back wall 12 and a respective of the sides 20 and 21. The members 49 have integral outwardly extending flanges or mounting bosses 51, respectively. Lower curved portions of said bosses 51 extend outwardly from floor portion 19, and the bearings 23 heretofore described are secured by welding or the like to said bosses, as illustrated in FIG. 3 at 115.

A pin 52, the inner end of which is rigidly secured to an upper portion of each flange 51, is projected outwardly from its securance, and provides an anchor for the upper end portion 116 of a balancing compression spring 53. The lower end portion of each spring 53 comprises a rod 117 which is rigidly secured to a lug 54 against which it exerts its compression force. Each lug is rigidly secured to one of the dividers 31 and 32 from respective of which each is projected outwardly. Accordingly, the deck 26 floats on the balancing springs 53 about the pivot shaft 25, the springs 53 being adapted to urge sensors 44 into ground engagement.

Additionally, an upper portion of each of the flanges or bosses 51 provides a mounting member for a bracket 55, each of which supports an upper end portion of a relief valve mechanism generally designated 56, one of which is clearly shown in FIG. 1 and comprises a valved structure 57. The illustrated valved structure 57 controls a hydraulically actuated ram generally designated 61 and to that end is operably connected to one end of a high pressure fluid inlet line 58, one end of a fluid bypass line 59 and one end of a fluid line 60 which at its opposite end connects to the cylindrical body 62 of ram 61. The fluid line 59 is a bypass, being connected to a fluid reservoir (not shown). By a fluid conduit or line 64, the cylindrical body 62 is connected to a platform control valve 65.

As illustrated in FIG. 1, the valved structure 57 has a reciprocative stem 66 for control of flow in said valved structure. The lower end portion of said stem is adjustably threaded in one end portion of a link or connector 67 in the opposite end portion of which there is adjustably threaded the upper end portion of a rod or tie 68. Rod 68 serves as a rigid connector between said link 67 and a slide or slotted bar 69 to which the lower end of said rod 68 is connected or with which it is integral. The slide or bar 69 has an elongated slot 70 which at its opposite ends is defined by pin abutments or stops 75 and 76, respectively. There is engaged in slot 70 the outer end portion of a pin 71, the inner end portion of which is rigidly secured to the divider 31 from which said pin 71 is projected outwardly into said slot 70.

The ram 61 comprises a hydraulic piston or rod 63 which is reciprocative relative to body or cylinder 62. The outer end portion of the piston 63 is pivotally secured between a pair of adjacent ears of a boss or bracket 72 by means of a fastener such as a pin or the like 73, the bracket 72 being secured by any suitable means to the lower surface 17 of the feeder box 13. The upper end portion of the feeder box 13 may be pivotally connected to a frame part or forward body portion of the harvesting device in connection with which the present invention is employed by means (not shown), the nature of which will be readily apparent to those skilled in the art. The inner end portion 74 of the cylinder or ram body 62 may be suitably supported on a lower frame portion such as an axle or the like (not shown) of the aforesaid harvesting device.

By reason of the foregoing construction, the deck 26 is adapted to rock to move each pin 71 within the limits provided by abutments 75 and 76 of its associated slot 70 without having any effect upon the valve stems 66. However, should an unusual ground surface condition occur during harvesting of a nature which would cause the deck 26 to rock sufficiently to cause a pin 71 to engage an abutment 75 or 76 with force adequate to push or pull valve stem 66, the relief valve mechanism 56 will be triggered to actuate ram 61. The valve arrangement in valved structure 57 is such that upon reciprocation of stem 66 longitudinally of its axis in either direction, ram 61 will be actuated to extend rod 63 rapidly upwardly and forwardly to cause elevation of the entire header including the platform 11 and the feeder box 13 about the header pivot (not seen), the ram 61 and associated structures serving as relief or safety means to guard the cutting mechanism from hazards of damage incident to unusual ground contour conditions.

A common extreme ground contour variation would be an irrigation moat, for example. As the platform 11 would cross the moat, the deck 26 would be forced downwardly by gravity and springs 53 tending to drive the cutting mechanism toward a ground digging position. However, in accordance with the instant teaching, the ram 61 is actuated prior to such occurrence which is thereby precluded.

To return the header 10 after actuation of ram 61, ram-actuating pressure may be relieved by operation of a control 120 to connect line 64 to a bypass line 121 through the valve 65. Various means, including manual, for operation of control 120 may be employed.

Sickle 42 may be driven either hydraulically or mechanically. Should it be driven hydraulically, the requirement to provide a linkage to accommodate the pivoting action of the deck 26 would be obviated, as the hydraulic tubes would be carried directly to a sickle motor which could be supported on an extension of the carrier 37. Accordingly, such sickle motor would rock with the cutting mechanism, the flexible character of the tubes being such that they would accommodate any rocking movement of the deck 26. However, when a mechanical linkage is provided for driving the sickle, means are required to accommodate such mechanical linkage, parts of which must be rockable with the rocking of the deck 26 and parts of which must be relatively stationary.

In the instant embodiment of the invention, a conventional mechanically actuated sickle drive is employed in which the input end portion 122 of the sickle 42 is connected to an elongated lever 79 by means of a ball joint generally designated 123. The ball joint comprises a ball 124 carried on the upper end of a stem 76 the lower end of which is secured to the sickle end portion 122 by a fastener such as screw 78, as illustrated in FIG. 2.

The ball 124 operably engages and is rockable within a ball socket 80. Socket 80 comprises a ball cap 125 which is integral with the output end of arm 79 and a ball seat or rest member 126 spaced from said cap 125 and having an extension 127 which is connected to arm 79 by fasteners 128.

A medial portion of lever 79 is pivoted as at 81 to a bracket 82. Bracket 82 is rigidly secured, by welding or the like as at 129, to an outer extension 83 of the pivot shaft 25. The outer end portion 84 of a crank arm 85 is pivotally connected to the rear end portion 86 of the lever 79 by means including a pivot pin 87, as clearly seen in FIG. 1. The inner end portion of the crank arm 85 is operably connected to the eccentrically disposed crank pin 88 of a crank disc 89.

The crank disc 89 is concentrically mounted on a stub shaft 93 which is projected rearwardly from the wall 12 through a bearing member 90. Bearing member 90 is rigidly supported on the lower and outer end portion of a bracket 91. Bracket 91 is carried or supported by or connected to a vertical mounting strip or boss 92, boss 92 being rigidly secured to a medial part of rear wall 12 by any suitable means, as illustrated in FIG. 3.

A sheave 94 is secured on an outer end portion of said shaft 93. The sheave 94 is retained from displacement axially of shaft 93 by a retainer 95 which holds the sheave against the rear surface of said bearing member, the crank disc 89 being retained against the forward face of said bearing member 90. The sheave 94 is operably connected to a power source (not shown) by means of a pulley belt or the like 96, to thereby drive the crank disc 89 and its eccentric pin 88.

By reason of the foregoing construction, bracket 82 will be caused to rock as deck 26 rocks because of securance of said bracket to the shaft 25 which rocks with said deck 26. Accordingly, the lever 79 will rock either clockwise or counterclockwise with respect to FIG. 2, depending upon the direction in which the deck 26 rocks.

As deck 26 rocks, the forward end portion of lever 79 will follow the cutting mechanism by reason of connection at joint 123. Additionally, the rear end portion 86 of said lever is free to rock either upwardly or downwardly by reason of its connection. The crank pin 88, for all positions of deck adjustment, is adapted to rotate about the axis of the pin 93 to impart a reciprocative motion in the crank arm 85 to rock the lever 79 about the pivot 81, in turn to reciprocate the sickle 42.

In accordance with the instant teachings, the cutting adjustment of the cutting mechanism to a suitable height with respect to the crop will be attended by reason of the floating action about the shaft 25 and the twisting action about the axis of the torsion element 46 which is disposed adjacent shaft 25. The parts thereby adapted to be adjusted are relatively light in comparison to the weight of structures required to be moved in conventional devices for cutting adjustment of their cutting mechanisms. In addition to the adjustable features of the deck, the invention contemplates a relief adjustment for protecting a cutting mechanism from injury incident to usual changes in ground topography, and therefor provides means for moving the platform quickly and independently of its normal adjustment mechanism although triggered by action thereof.

As many substitutions or changes could be made in the above described construction, and as many apparently widely different embodiments of the invention within the scope of the claims could be constructed without departing from the scope and spirit thereof, it is intended that all matter contained in the accompanying specification shall be interpreted as being illustrative and not in a limiting sense.

What is claimed is:

1. A header construction for connection to combine bodies and the like and comprising a feeder housing having upper rear and lower forward end portions adapted for mounting in alignment longitudinally of a path of harvesting, said upper rear end portion adapted for mounting in crop delivery association on the combine body, said lower forward end portion defining a harvested crop receiving opening; an elongated platform having a longitudinal axis disposed transversely of said feeder housing adjacent said lower forward end portion and defined by a floor, a pair of parallel opposite side walls extending upwardly from said floor, a lead end and a rear end characterized by a rear wall having therein a medial crop delivery opening disposed in crop translocation alignment with said crop receiving opening; transverse conveyor means for moving harvested crop from the floor through said crop delivery opening; an elongated cutter mechanism disposed for crop cutting transversely in a harvesting path forwardly of the lead end of said platform and extending longitudinally thereof; sensing means secured to and having a portion disposed at a fixed distance below the cutter mechanism for detecting changes in contour of the ground surface, and a floating connection including pivoting means disposed between said floor at the lead end of said platform and said cutter mechanism for rocking thereof in response to changes in ground surface contour, said pivoting means including a pair of parallel plates mounted adjacent the lead end of said platform and disposed in telescopic association with said side walls to preclude spillage of cut crop from the sides of the header.

2. A header construction for connection to combine bodies and the like and comprising a feeder housing having upper rear and lower forward end portions adapted for mounting in alignment longitudinally of a path of harvesting, said upper rear end portion adapted for mounting in crop delivery association on the combine body, said lower forward end portion defining a harvested crop receiving opening; an elongated platform having a longitudinal axis disposed transversely of said feeder housing adjacent said lower forward end portion and defined by a floor, a pair of parallel opposite side walls extending upwardly from said floor, a lead end and a rear end characterized by a rear wall having therein a medial crop delivery opening disposed in crop translocation alignment with said crop receiving opening; transverse conveyor means for moving harvested crop from the floor through said crop delivery opening; an elongated cutter mechanism disposed for crop cutting transversely in a harvesting path forwardly of the lead end of said platform and extending longitudinally thereof; sensing means connected to and having a portion disposed at a fixed distance below the cutter mechanism for detecting changes in contour of the ground surface; an elongated pivoted connection mechanism disposed between said floor and said cutter mechanism and connected thereto for rocking thereof responsive to changes in ground surface contour, and torsion means for twisting the cutter mechanism longitudinally thereof responsive to variations in ground surface contour transversely of a harvesting path.

3. The device defined in claim 2 in which the cutter mechanism comprises an elongated cutter deck extending longitudinally of the platform and having a leading end and a rear end pivotally connected to the lead end of the platform at the floor, an elongated cutter bar secured to the leading end of said deck and extending longitudinally thereof, a reciprocative sickle mounted in operative association with said cutter bar, and said torsion means comprising an elongated torsion member mounted on the rear end of said cutter deck and extending longitudinally thereof.

4. A header construction for connection to combine bodies and the like and comprising a feeder housing having upper rear and lower forward end portions adapted for mounting in alignment longitudinally of a path of harvesting, said upper rear end portion adapted for mounting in crop delivery association on the combine body, said lower forward end portion defining a harvested crop receiving opening; an elongated platform having a longitudinal axis disposed transversely of said feeder housing adjacent said lower forward end portion and defined by a floor, a pair of parallel opposite side walls extending upwardly from said floor, a lead end and a rear end characterized by a rear wall having therein a medial crop delivery opening disposed in crop translocation alignment with said crop receiving opening; transverse conveyor means for moving harvested crop from the floor through said crop delivery opening; an elongated deck having a leading end and a rear end pivotally connected to the lead end of the platform and extending longitudinally thereof; an elongated cutter bar secured to the leading end of the deck and extending longitudinally thereof; a reciprocative sickle mounted in operative association with said cutter bar; sensing means for spacing said cutter bar a fixed distance from and detecting the contour of the surface of the ground adjacent said cutter bar; spring means biasing said sensing means into engagement with the ground; and a pair of parallel side members having lower end portions rigidly secured to said deck, said opposite side walls having facing surfaces, said side members slidably engaging said facing surfaces as said deck rocks to telescopically guide the movement thereof relative to said platform.

5. The device defined in claim 4 further characterized by a pair of parallel side members having lower end portions rigidly secured to said deck, said opposite side walls having facing surfaces, said side members slidably engaging said facing surfaces as said deck rocks to telescopically guide the movement thereof relative to said platform.

6. A header construction for connection to combine bodies and the like and comprising a feeder housing having upper rear and lower forward end portions adapted for mounting in alignment longitudinally of a path of harvesting, said upper rear end portion adapted for mounting in crop delivery association on the combine body, said lower forward end portion defining a harvested crop receiving opening; an elongated platform having a longitudinal axis disposed transversely of said feeder housing adjacent said lower forward end portion and defined by a floor, a pair of parallel opposite side walls extending upwardly from said floor, a lead end and a rear end characterized by a rear wall having therein a medial crop delivery opening disposed in crop translocation alignment with said crop receiving opening; transverse conveyor means for moving harvested crop from the floor through said crop delivery opening; an elongated cutter mechanism disposed for crop cutting transversely in a harvesting path forwardly of the lead end of said platform and extending longitudinally thereof; sensing means connected to the cutter mechanism for detecting changes in contour of the ground surface, and a floating connection including pivoting means disposed between said floor at the lead end of said platform and said cutter mechanism for rocking thereof in response to changes in ground surface contour, said pivoting means including a pair of parallel plates in telescopic association with said side walls to guide the rocking of said cutter mechanism.

7. A combine having a body with a crop inlet opening; a feeder housing having upper rear and lower forward end portions, said upper rear end portion pivotally connected to the combine body adjacent said crop inlet opening, said lower forward end portion defining a harvested crop receiving opening; an elongated platform having a longitudinal axis disposed transversely of said lower forward end portion of said feeder housing, said elongated platform including a floor having a lead end and a rear end and a rear wall having therein a medial crop delivery opening disposed in crop translocation alignment with said crop receiving opening; transverse conveyor means moving harvested crop from the floor through said crop delivery opening; an elongated cutter mechanism disposed for crop cutting transversely in a harvesting path forwardly of the lead end of said platform and extending longitudinally thereof; sensing means secured to and having a portion disposed at a fixed distance below the cutter mechanism for detecting changes in contour of the ground surface; pivot means between the lead end of said floor and said cutting mechanism to permit rocking of said elongated cutter in response to changes in ground surface contour; a hydraulic ram pivotally connected at one end to said combine body and at the other end to said feeder housing; a hydraulic valve means mounted on said feeder housing, said hydraulic valve means having an input, an output and a bypass port, and means for controlling fluid flow through said valve such that it egresses from either the output or the bypass port; fluid conduit means connecting said output port and said hydraulic ram such that fluid flow through said valve egressing through the output port will cause an upward rotation of said feeder housing above its pivotal connection with said combine body; link means, between said means for controlling fluid flow through said valve and said elongated cutter, operable when the elongated cutter has been rocked to an extreme up or down position to cause egression of fluid through said output port.

References Cited

UNITED STATES PATENTS

| | | | |
|---|---|---|---|
| 2,352,257 | 6/1944 | Dray | 56—21 |
| 2,750,727 | 6/1956 | Wright | 56—208 |
| 3,137,984 | 6/1964 | Shonkwiler | 56—214 |
| 3,238,709 | 3/1966 | Williams | 56—208 |
| 3,309,852 | 3/1967 | Allen | 56—208 |
| 3,324,639 | 6/1967 | Halls et al. | 56—23 |

ANTONIO F. GUIDA, *Primary Examiner.*